United States Patent [19]
Olin et al.

[11] Patent Number: 5,843,553
[45] Date of Patent: *Dec. 1, 1998

[54] HIGH PERFORMANCE MEDIA FOR OPTICAL RECORDING

[75] Inventors: George R. Olin; Yuan-Sheng Tyan, both of Webster; Pranab K. Raychaudhuri, Rochester; Fridrich Vazan, Pittsford, all of N.Y.

[73] Assignee: Eastman Kodak Company, Rochester, N.Y.

[ * ] Notice: The term of this patent shall not extend beyond the expiration date of Pat. No. 5,585,158.

[21] Appl. No.: 902,544

[22] Filed: Jul. 29, 1997

[51] Int. Cl.$^6$ ...................................... B32B 3/00
[52] U.S. Cl. ................ 428/64.1; 428/64.2; 428/64.4; 428/64.5; 428/64.6; 428/412; 428/457; 428/913; 430/270.11; 430/495.1; 430/945; 369/283; 369/288

[58] Field of Search ..................... 428/641, 64.2, 428/64.5, 64.6, 412, 457, 913; 430/270.11, 270.12, 270.13, 495.1, 945; 369/283, 288

[56] References Cited

U.S. PATENT DOCUMENTS 5,585,158 12/1996 Raychaudhuri et al. .............. 428/64.1

*Primary Examiner*—Elizabeth Evans
*Attorney, Agent, or Firm*—Raymond L. Owens

[57] ABSTRACT

A recordable element including a substrate and having over its surface, in order, an optical recording layer and a light reflecting layer, the improvement includes an optical recording layer containing $Te_aGe_bC_cH_dO_e$ where a, b, c, d, and e are atomic percents such that a+b+c+d+e=100, and wherein 10<a<40, 10<b<60, 5<c<35, 10<d<5, e≧0; an the optical recording layer having one or more sublayers which can be of different compositions; and the thickness t of the optical recording layer is 0.7 Tmin<t<1.3 Tmin.

18 Claims, 9 Drawing Sheets

HIGH PERFORMANCE MEDIA FOR OPTICAL RECORDING

FIELD OF THE INVENTION

The present invention relates to optical recording elements with improved performance.

BACKGROUND OF THE INVENTION

Although successful applications have been made of many organic and inorganic media in optical recording it is difficult with these media to meet the requirements for many emerging applications. It is desired to have media for specific applications with a special emphasis on the improvement of data density, wavelength dependence of reflectivity, recording sensitivity, nonlinearity, peak shifts, jitter and window margin.

Jitter of a recorded feature is related to its ability of being detected without error during readback. Transitions from nominally identical recorded feature will not be read back precisely at the same time because of the slight variation in feature length and shape and system noise. This gives rise to a spread in detection time. A detection time window can read all these features if the distribution is so narrow as to lie completely within the time window. On the other hand, if the distribution is broad such that some of the transitions occur outside the window, they will result in a decoding error. Jitter (S) is a measure of the overall noise and is the square root of the variance of the distribution of detection time commonly modeled as a Gaussian curve. The distribution of detection time may not be exactly centered in the timing window, and the peak shift will increase the probability of a decoding error even for a narrow distribution. The window margin (WM) is a derived parameter involving jitter and peak shifts. The lower the jitter and peak shifts the higher is the WM. The WM can be viewed as a figure of merit in that the disc with higher WM has a greater probability of successful read back than the one with lower WM. Also the disc with higher WM is expected to be read back by a wider variety of readers than the one with lower WM that is otherwise similar.

SUMMARY OF THE INVENTION

Therefore it is an object of this invention to provide recording media with improved properties particularly with respect to recording sensitivity, jitter, nonlinearity and WM.

This object is achieved by making a recordable element including a substrate and having over its surface, in order, an optical recording layer and a light reflecting layer, the improvement comprising:

(a) the optical recording layer containing $Te_aGe_bC_cH_dO_e$ where a, b, c, d, and e are atomic percents such that a+b+c+d+e=100, and wherein 10<a<40, 10<b<60, 5<c<35, 10<d<35, e≧0;

(b) the optical recording layer having one or more sublayers which can be of different compositions; and (c) the thickness t of the optical recording layer is 0.7 Tmin<t<1.3 Tmin.

This object is further achieved by a process for making a recordable element including a substrate and having over its surface, in order, an optical recording layer and a light reflecting layer, comprising the steps of:

a) providing an optical recording layer by sputtering the optical recording layer containing $Te_aGe_bC_cH_dO_e$ where a, b, c, d, and e are atomic percents such that a+b+c+d+e=100, and wherein 10<a<40, 10<b<60, 5<C<35, 15<(c+d)<65, e≧0, the optical recording layer having one or more sublayers which can be of different compositions;

(b) adjusting the thickness t of the optical recording layer to be in a range of 0.7 Tmin<t<1.3 Tmin; and (c) heat treating the recording element to modify the recording properties.

The media produced in accordance with the present invention have improved performance parameters including recording sensitivity, nonlinearity, jitter, and WM.

DETAILED DESCRIPTION OF THE PREFERRED EMBODIMENTS

Figure 1:
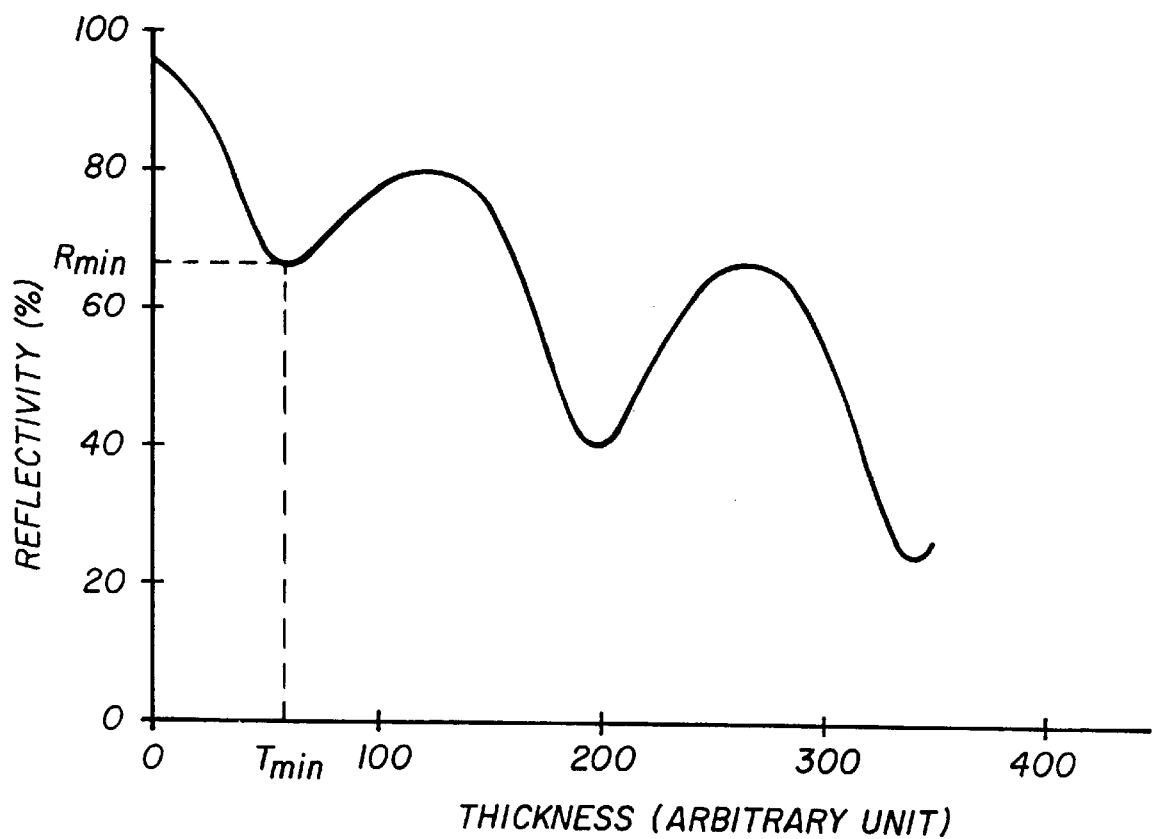
FIG. 1 is a representative plot of the element reflectivity versus thickness of the optical recording layer resulting from the light interference effect.

It is an important feature of the invention that the recording layer and the reflecting layer of the element are selected such that the thickness of the recording layer is close to Tmin for the application wavelength. The term Tmin can be understood with reference to FIG. 1 which shows a representative plot of reflectivity as a function of recording layer thickness of a recording element. The recording element for the FIG. 1 is comprised of a recording layer deposited on a polycarbonate substrate and a Au reflector deposited over the recording layer. The thickness of the reflecting layer is such that its transmittance is insignificant. The reflectivity presented in FIG. 1 is determined at 780 nm wavelength and is measured through the substrate. Those skilled in the art recognize that the reflectivity can be measured using a spectrophotometer. The optical properties of the recording layer and the unit of its thickness in this plot are arbitrary. However, the curve is representative of all recording elements of this type. Starting from its maximum value the reflectivity goes down with increasing thickness to its minimum value before rising again to another maximum thus generating infinite number of local minima and maxima due to optical interference effect. The local minimum that resulted due to destructive interference at the lowest recording layer thickness is the first reflectivity minimum, hereafter referred to as Rmin. The thickness corresponding to Rmin for the purpose of discussion is termed Tmin. Preferably, the thickness t of the optical recording layer is 0.7 Tmin<t<1.3 Tmin. It will be understood that the recording layer can include one or more sublayers. With reference to FIG. 1, Rmin is about 66% and Tmin is about 58 thickness units. However, it should be pointed out the Rmin and the Tmin will be different from those shown in FIG. 1 when measuring wavelength is altered, for example, to 635 nm although the nature of the plot will remain similar.

Series of recording elements with varying thickness of the recording layer having the same composition (hereafter termed as thickness series) have been made. While studying a thickness series it has been discovered that the performance depends strongly on the recording layer thickness and is maximized near Tmin. This is totally surprising as it is believed there exists no prior suggestion or expectation for this result.

Thus, it is an important feature of the present invention that the recording layer thickness is selected to be near Tmin. However, it has been determined that the recording layer will still be effective when its thickness is in the range of 0.7 Tmin to 1.3 Tmin. Those skilled in the art will recognize that the Rmin can be conveniently changed to a desired value by choosing a material with appropriate optical constants and/or adjusting the deposition parameters that influence the optical constants of the recording layer.

Figure 2:
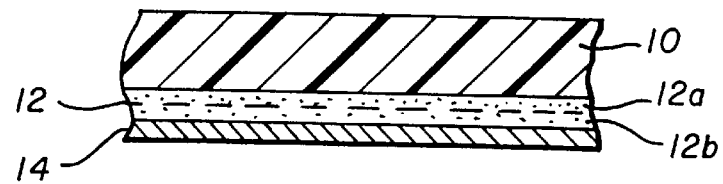
FIG. 2 is a schematic representation, in cross-section, of one element in accordance with the invention.

An optical recording element is shown in FIG. 2. The substrate 10 has thereon, a recording layer 12, and a reflective layer 14. The recording layer in this example is a bilayer having two sublayers 12a and 12b. It will be understood that the recording layer can be a single layer or a layer comprising more than one sublayer. The recording layer 12 can also have a material composition graded along its thickness. The thickness of the optical recording layer 12 is selected so that the recording layer thickness is 0.7 Tmin to 1.3 Tmin. Protective layers are commonly used on reflector but will not be discussed here.

Recording is accomplished by marking the recording layer 12 with a write laser focused on the recording layer 12. The focused laser beam heats the recording layer to temperatures substantially above the room temperature and induces changes in the media. The likely changes may include agglomeration of the metallic components in the layer, or the dissociation of material to form gaseous species which, in turn, causes the deformation of the media package in the form of bubbles, voids, or pits, etc. Some distortion of the substrate material might also be induced. In any event, the combination of some or all of these changes forms marks which can then be read back by the focused read laser beam.

For a more complete explanation of the optical recording and play back processes as well as the construction of optical discs, see Optical Recording, Allan B. Marchant (1990).

The Substrate

The substrate 10 can be made from optically transparent resins with or without surface treatment The substrate is transparent and light which illuminates the recording layer 12 passes through the substrate 10. The preferred resins for the FIG. 2 embodiment are polycarbonate or polyacrylate. The substrate 10 may include a guide groove for laser tracking.

The Reflective Layer

The reflective layer 14 can be any of the metals conventionally used for optical recording materials. Examples of such metals include elements selected from the group consisting of Au, Ag, Cu, Al and alloys there of that can be vacuum evaporated or sputtered. Gold is most commonly used. The reflector used here was a 700 A Au layer sputter deposited in pure Ar.

The Recording Layer

The present invention utilizes a recording layer 12 having one or more sublayers containing $Te_aGe_bC_cH_dO_e$ where a, b, c, d, and e are atomic percents such that a+b+c+d+e=100, and wherein 10<a<40, 10<b<60, 5<c<35, 10<d<35, e≧0 when two or more sublayers are used each sublayer can have a different composition.

The preferred method of recording layer deposition is DC reactive sputtering of target(s) comprising Ge and Te. The atmosphere contains a sputter gas such as Ar or Kr, and a reactive gas such as methane, acetylene, and other hydrocarbons. Useful films can also be prepared using other gases such as $H_2$, $CO_2$. When carbon and hydrogen are included in the reactive gas mixture, then the sublayer(s) can include elements selected from the group consisting of Ge, Te, and C,H. An alloy-sputtering method can be used wherein a single target contains both Te and Ge. The recording layer 12 can also be deposited by cosputtering wherein each target is constituted of a single element. When two or more sublayers having different compositions (produced by different flow rates) are used, these compositions can be selected so that each of them have different thermal and optical properties. The sublayer adjacent to the substrate preferably has a lower hydrocarbon content than the sublayer adjacent to the reflecting layer. This is accomplished by varying hydrocarbon flow rate. By properly selecting sublayer configurations the sensitivity of the recording layer is enhanced.

Heat Treating

The recording element can be heat treated. The recording element can have its properties changed by heat treatment for improving its performance. For a more detailed description of the heat treatment process, see U.S. Pat. No. 5,783,623, the disclosure of which is incorporated herein by reference.

Disc Measurements

The discs can be tested using a conventional optical disc tester, for example, an automated tester including a Kodak PCD 600 writer/reader. The recording and readback were performed at the constant linear velocity of 2.8 m/s. The following parameters can be determined: Rtop (reflectivity of long land after recording), optimum recording power (ORP), written contrasts (the decrease in reflectivity due to recording divided by Rtop), and nonlinearity, NL (maximum difference of peak shifts among all features) WM, and jitter. In the compact disc recording scheme there are 18 features—nine of them are made by laser exposures and are called marks and the remaining are features created by nonexposure to a laser beam and are called lands. The readback signals are expressed in multiples of detection window width, T (T=231.4 ns for a linear velocity of 1.4 m/s): 3T, 4T, 5T . . . 11T. The corresponding marks are designated as 3M, 4M, 5M . . . 11M with 3M being the smallest and 11M being the largest of the marks. Similarly there are nine lands designated as 3L, 4L, 5L . . . 11L. S3M, S4M . . . S11M are the jitter of the corresponding marks. S3L, S4L . . . S11L are the jitter of the corresponding lands between marks.

EXAMPLE 1

Recording layers were deposited on polycarbonate disc substrates in $Ar+CH_4$ environment following a process similar to those described in U.S. Pat. No. 5,585,158, the disclosure of which is incorporated herein by reference. Eight discs were fabricated according to FIG. 2. The deposition time for the sublayer 12a was fixed at 3.0 seconds and that for the sublayer 12b was varied in increments of 1 second from 5 to 12 seconds. These discs thus formed a thickness series.

After the deposition the discs were coated with a 700 A gold reflector and finished with a spun on and UV cured protective lacquer coat. The discs were heat treated in air for 16 hours at 110° C.

The discs were recorded and readback at a constant linear velocity of 2.4 m/s using a PCD600 writer/reader test system. The performance parameters that were determined were Rtop, ORP, NL, WM, and Smax (maximum jitter selected from jitters of all features). The results are given in Table 1.

TABLE 1

| Sublayer 12b deposition Time (sec) | Rtop(%) | Smax(ns) | Wm(%) | NL(ns) | ORP (mW) |
|---|---|---|---|---|---|
| 5 | 65.8 | 14.7 | 28.4 | 37.2 | 14.5 |
| 6 | 64.1 | 11.8 | 33.2 | 34.0 | 13.8 |
| 7 | 61.9 | 10.4 | 40.7 | 28.0 | 12.2 |
| 8 | 60.1 | 9.8 | 49.4 | 19.4 | 10.2 |
| 9 | 60.1 | 9.1 | 56.5 | 12.9 | 8.5 |
| 10 | 60.6 | 9.2 | 57.6 | 10.6 | 8.5 |
| 11 | 61.9 | 8.9 | 54.8 | 10.6 | 9.2 |
| 12 | 63.2 | 9.2 | 48.0 | 11.7 | 10.8 |

Figure 3A:
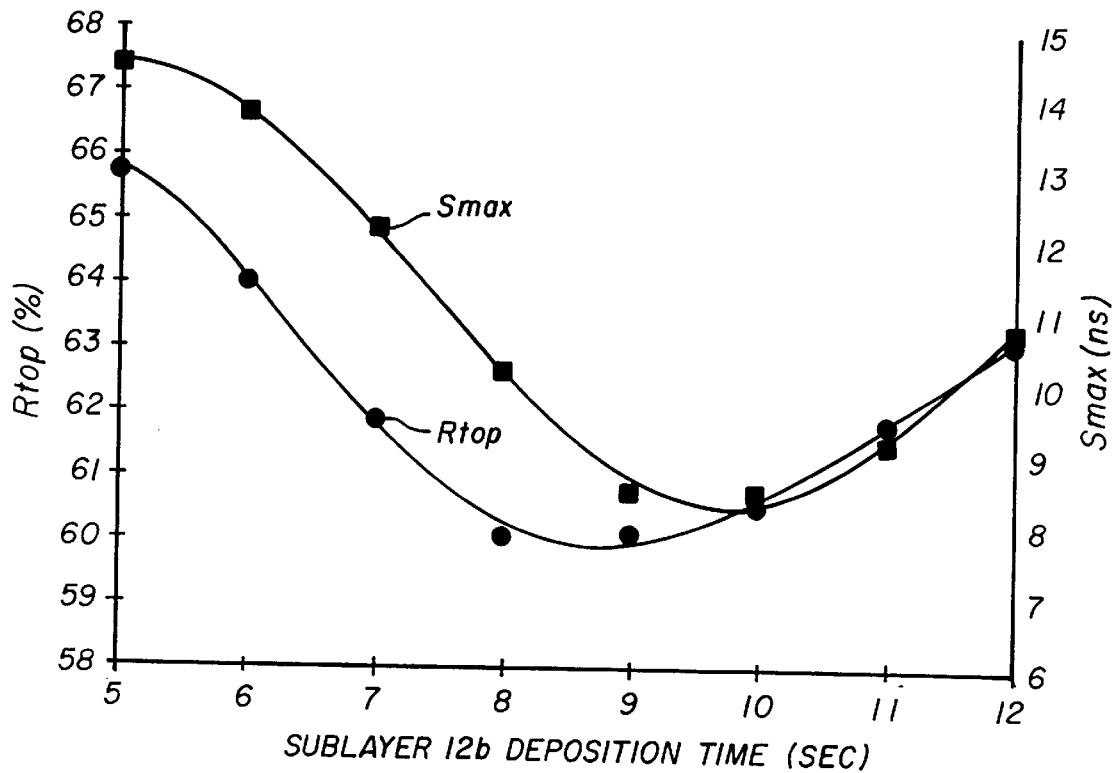
FIG. 3a is a plot of reflectivity called Rtop vs. deposition time of sublayer 12b and also Smax vs. deposition time of sublayer 12b.

The performance data of the discs are also shown in FIGS. 3a, 3b, 3c, and 3d. FIG. 3a is a plot of Rtop vs. deposition time of sublayer 12b. It is clear that Rtop reaches its minimum value when the 12 b deposition time is about 9 sec. The corresponding recording layer thickness (total thickness of 12a and 12b sublayers) is Tmin. It should be noted that, in FIG. 3a, on the right hand vertical axis, Smax is plotted. FIG. 3a shows that Smax drops with the sublayer 12b deposition time (thickness) and reaches its minimum value at 12b deposition time 9 to 10 sec. and then rises. It is clear that the lowest Smax occurs when the recording layer thickness is close to Tmin.

Figure 3B:
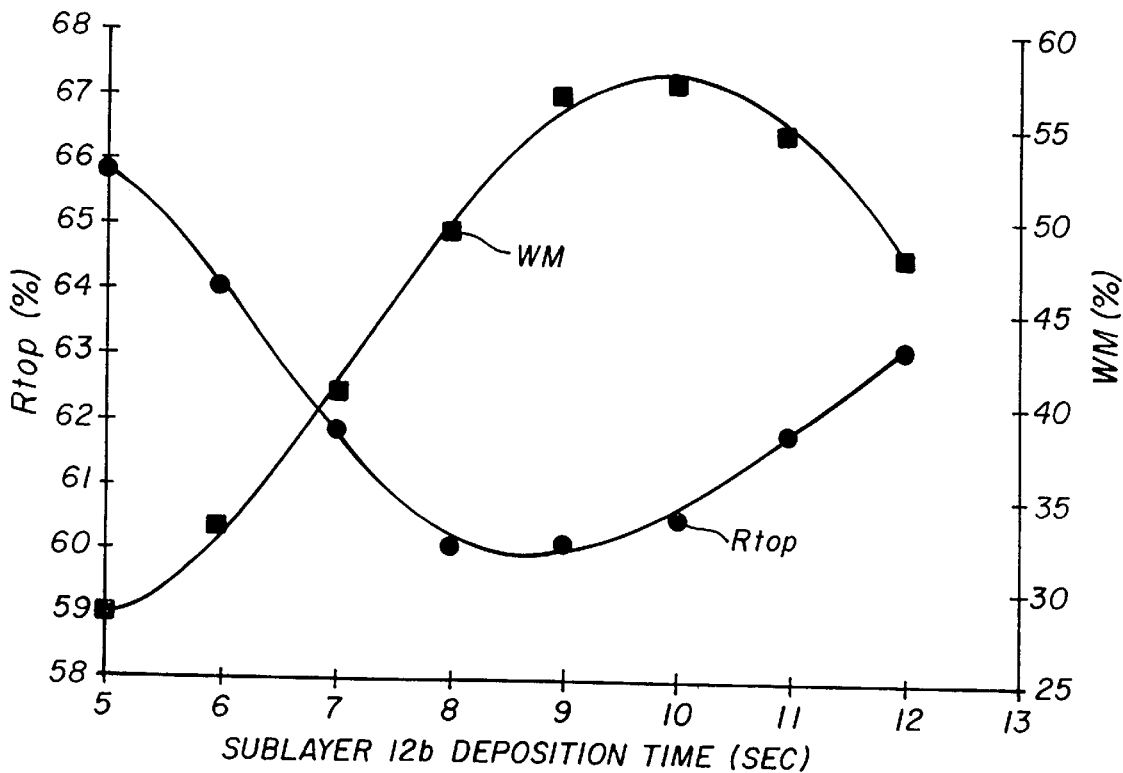
FIG. 3b is a plot of Rtop vs. deposition time as shown in FIG. 3a with an additional plot of WM vs. deposition time of sublayer 12b.

In FIG. 3b it is seen that the WM rises with the sublayer 12b deposition time, reaches its maximum value and then drops. FIG. 3b reveals that the highest WM occurs for the disc with the 12b deposition time of 10 seconds for which the recording layer thickness is close to Tmin.

Figure 3C:
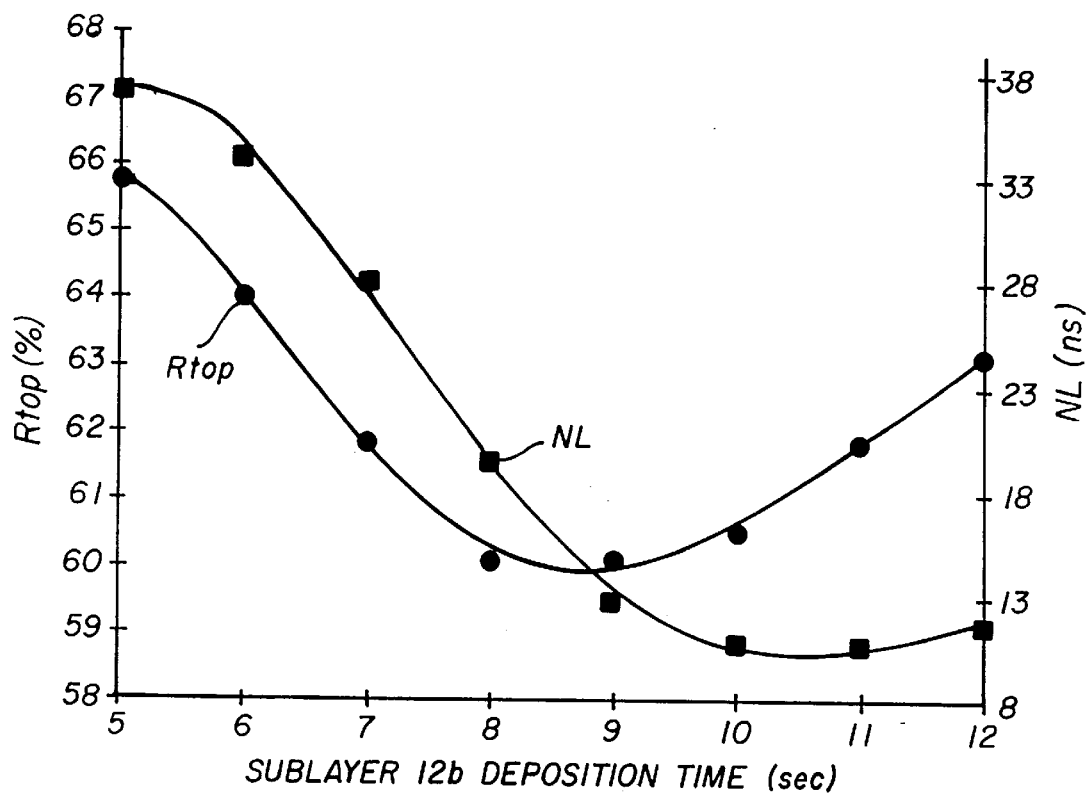
FIG. 3c is a plot similar to FIG. 3b except that nonlinearity (NL) is plotted in place of WM.

FIG. 3c shows that the NL drops with the sublayer 12b deposition time, reaches its minimum value and then rises. It is clear that the lowest NL occurs for the disc with the 12b deposition time of 10 seconds for which the recording layer thickness is close to Tmin.

Figure 3D:
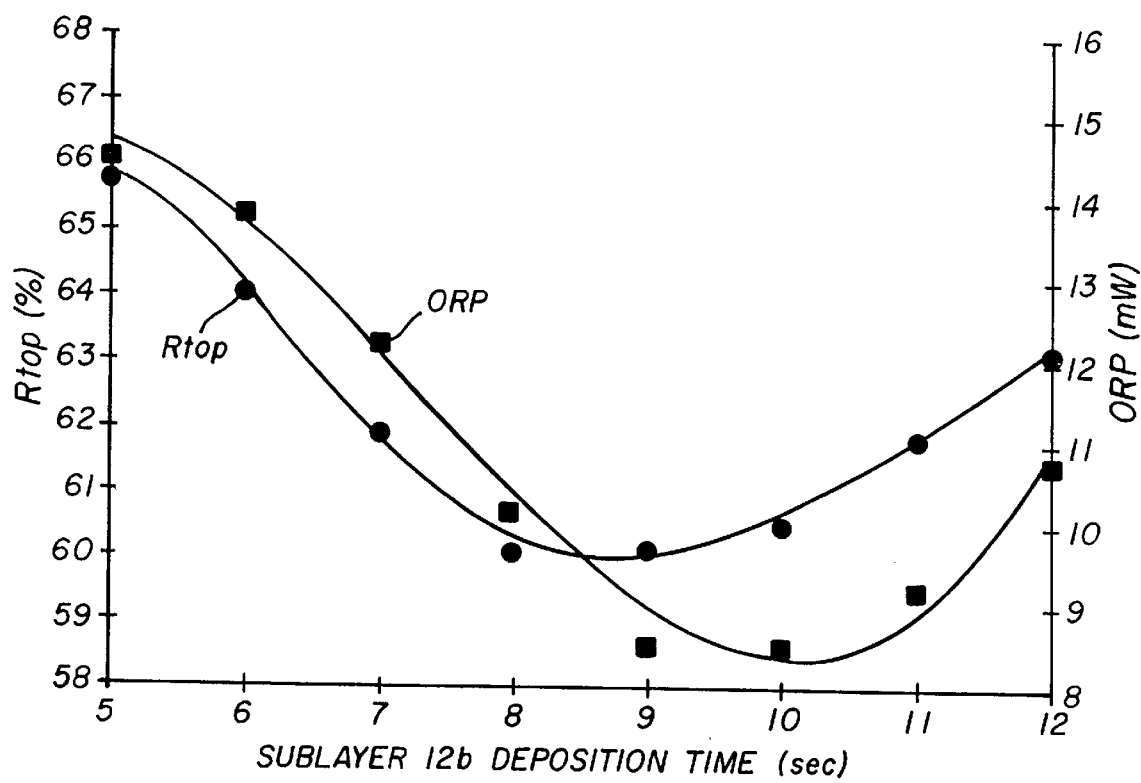
FIG. 3d is a similar plot to FIG. 3b except that in place of WM, the optimum recording power (ORP) is plotted.

FIG. 3d shows that the ORP decreases with the sublayer 12b deposition time, and then rises. Decrease in ORP means increase in writing sensitivity. It is clear from FIG. 3d that the highest writing sensitivity occurs for the discs with the sublayer 12b deposition time of 9 and 10 seconds for which the recording layer thickness is close to Tmin.

EXAMPLE 2

Another thickness series consisting of nine discs were made. The deposition time for the sublayer 12a was fixed at 4.0 seconds and that for the sublayer 12b was varied in increments of 1 second from 4 to 12 seconds.

After deposition, the discs were coated with a 700 A gold reflector and finished with a spun on and UV cured protective lacquer coat. The discs were heat treated in air for 15 hours at 92° C.

The discs were measured and their performance were determined using the PCD 600 writer/reader as outlined before. The results are given in Table 2.

TABLE 2

| Sublayer 12b deposition Time (sec) | Rtop(%) | Smax(ns) | Wm(%) | NL(ns) | ORP (mW) |
|---|---|---|---|---|---|
| 4 | 61.9 | 12.6 | 34.9 | 29.6 | 15.4 |
| 5 | 58.4 | 11.7 | 41.5 | 27.9 | 12.1 |
| 6 | 55.8 | 10.1 | 49.0 | 22.7 | 11.0 |
| 7 | 54.9 | 8.6 | 56.7 | 14.5 | 10.3 |
| 8 | 54.9 | 8.2 | 59.7 | 11.1 | 9.8 |
| 9 | 55.8 | 8.4 | 59.7 | 9.8 | 9.7 |
| 10 | 55.8 | 9.4 | 54.8 | 11.1 | 10.0 |
| 11 | 58.4 | 10.3 | 50.1 | 13.3 | 9.8 |
| 12 | 61.0 | 11.6 | 43.1 | 15.6 | 10.0 |

Figure 4A:
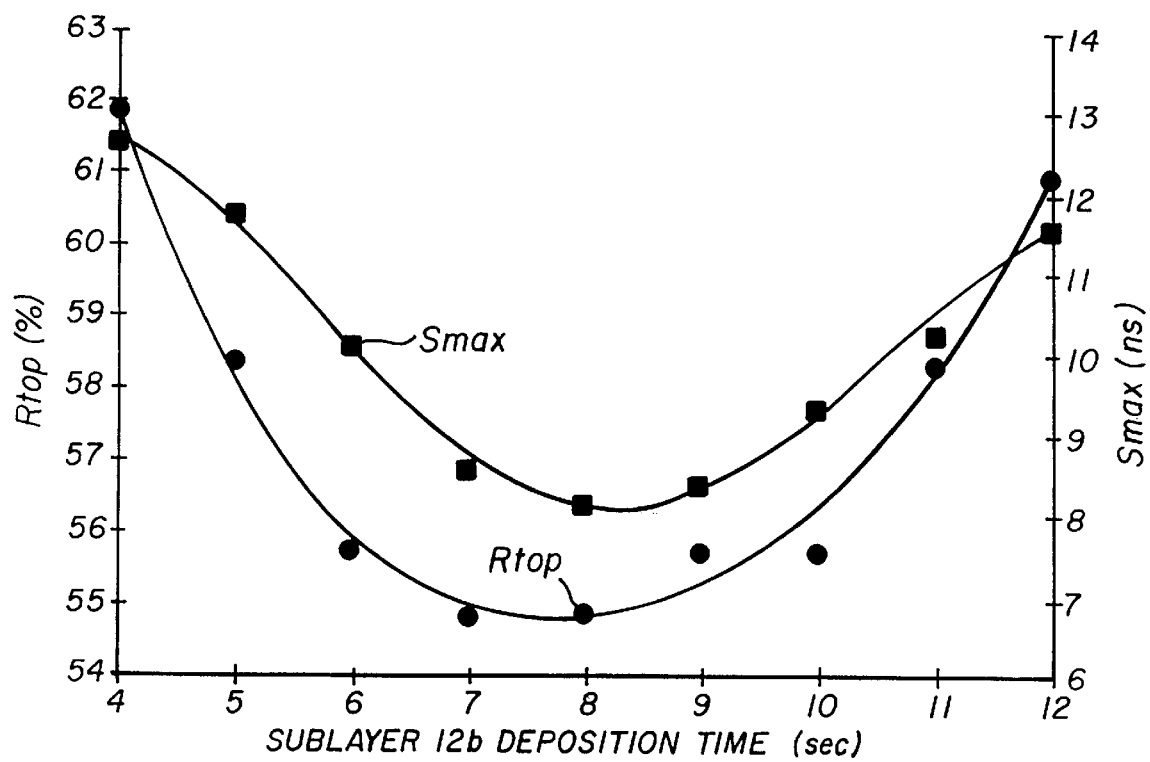
FIGS. 4a–4d are similar plots to corresponding plots in FIGS. 3a–3d but have different deposition times.

The performance data of the discs are also shown in FIGS. 4a, 4b, 4c, and 4d. FIG. 4a is a plot of Rtop vs. deposition time of sublayer 12b. It is clear that Rtop reaches its minimum value when the 12b deposition time is about 8 sec. The corresponding recording layer thickness (total thickness of 12a and 12b sublayers) is Tmin. It should be noted that, in FIG. 4a, on the right hand vertical axis, Smax is plotted. FIG. 4a shows that Smax drops with the sublayer 12b deposition time (thickness) and reaches its minimum value at 12b deposition layer time of 8 sec and then rises. It is clear that the lowest Smax occurs when the recording layer thickness is close to Tmin.

Figure 4B:
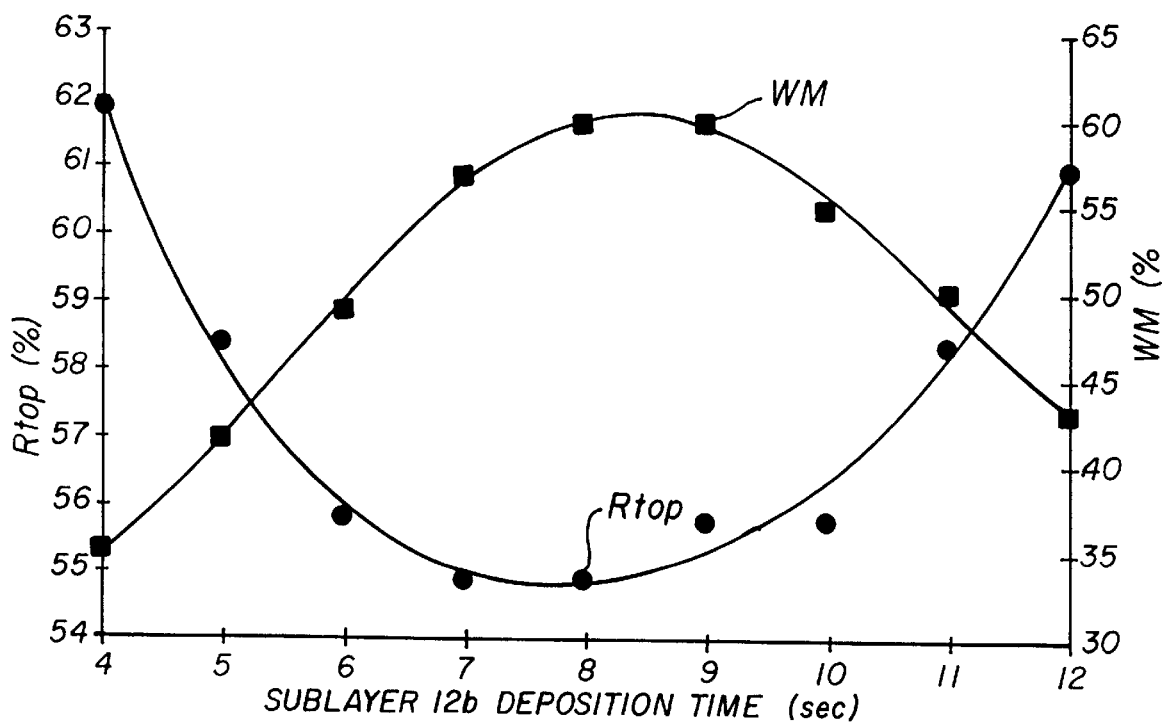

In FIG. 4b it is seen that the WM rises with the sublayer 12b deposition time, reaches its maximum value and then drops. FIG. 4b reveals that the highest WM occurs for the discs with the 12b deposition times of 8 and 9 seconds for which the recording layer thickness is close to Tmin.

Figure 4C:
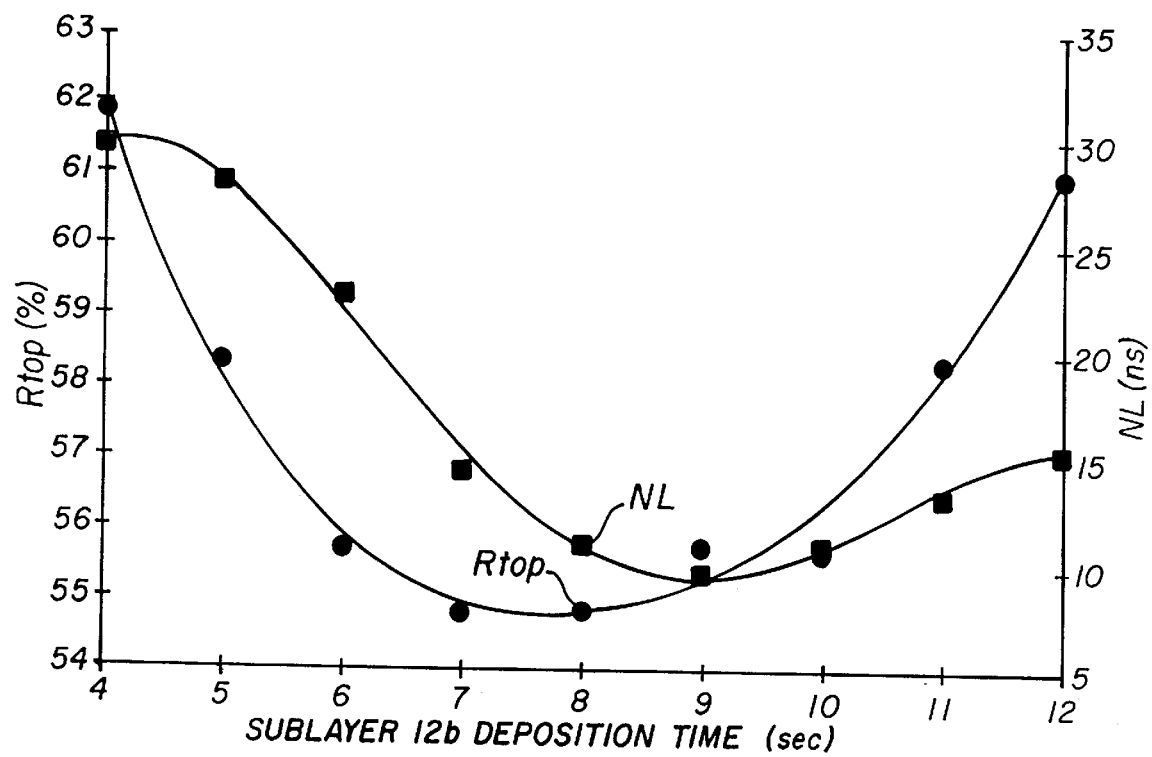

FIG. 4c shows that the NL drops with the sublayer 12b deposition time, reaches its minimum value and then rises. It is clear that the lowest NL occurs for the disc with the sublayer 12b deposition time of 9 seconds for which the recording layer thickness is close to Tmin.

Figure 4D:
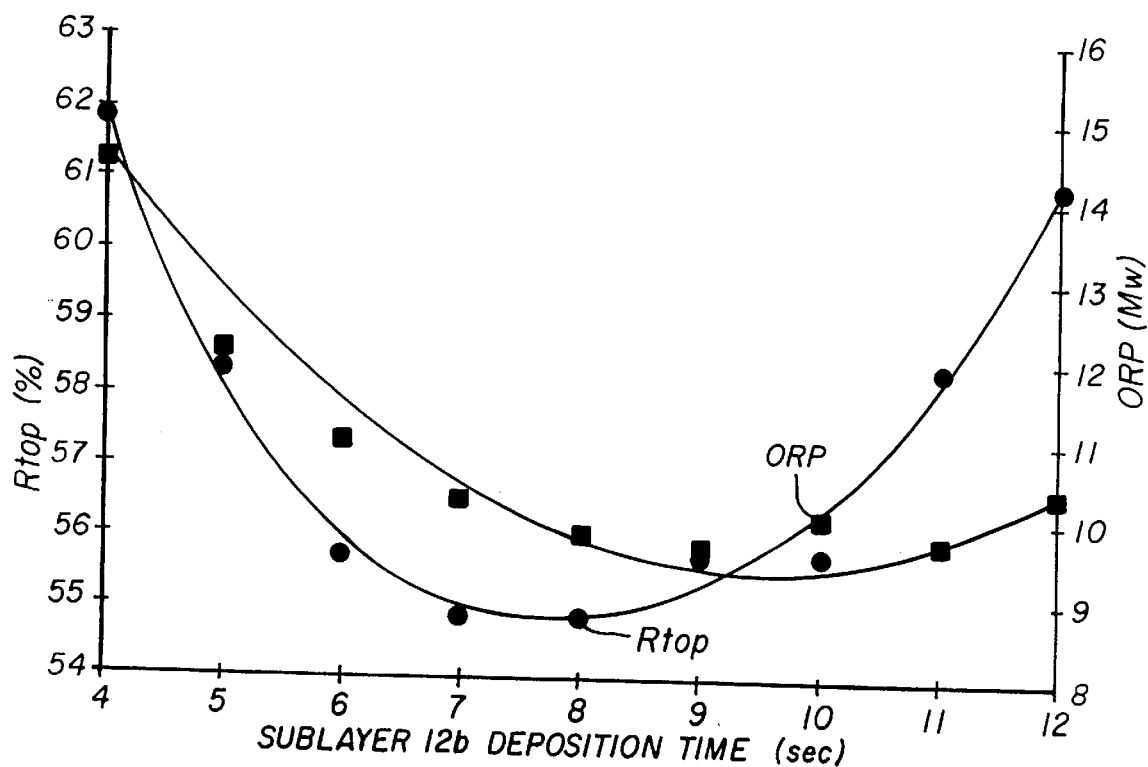

FIG. 4d shows that the ORP decreases with the sublayer 12b deposition time, and then rises. It is clear from FIG. 3d that the highest writing sensitivity occurs for the disc with the sublayer 12b deposition time of 9 seconds for which the recording layer thickness is close to Tmin.

EXAMPLE 3

Another thickness series consisting of nine discs were made. The deposition time for the sublayer 12a was fixed at 5.0 seconds and that for the sublayer 12b was varied in increments of 1 second from 4 to 12 seconds.

After deposition, the discs were coated with a 700 A gold reflector and finished with a spun on and UV cured protective lacquer coat. The discs were heat treated in air for 16 hours at 110° C.

The discs were measured and their performance were determined using the PCD 600 writer/reader as outlined before. The results are given in Table 3.

TABLE 3

| Sublayer 12b deposition Time (sec) | Rtop(%) | Smax(ns) | Wm(%) | NL(ns) | ORP (mW) |
|---|---|---|---|---|---|
| 4 | 61.0 | 11.5 | 43.7 | 24.9 | 11.5 |
| 5 | 58.4 | 10.3 | 49.1 | 22.0 | 10.3 |
| 6 | 57.5 | 8.6 | 57.5 | 12.8 | 8.6 |
| 7 | 57.5 | 7.9 | 61.4 | 10.0 | 7.9 |
| 8 | 58.4 | 8.4 | 59.8 | 9.9 | 8.4 |
| 9 | 60.1 | 9.4 | 54.8 | 11.2 | 9.4 |
| 10 | 61.9 | 10.4 | 50.7 | 11.9 | 10.4 |
| 11 | n/a | 11.4 | 44.4 | 14.2 | 11.4 |
| 12 | 66.7 | 13.4 | 34.8 | 18.6 | 13.4 |

Figure 5A:
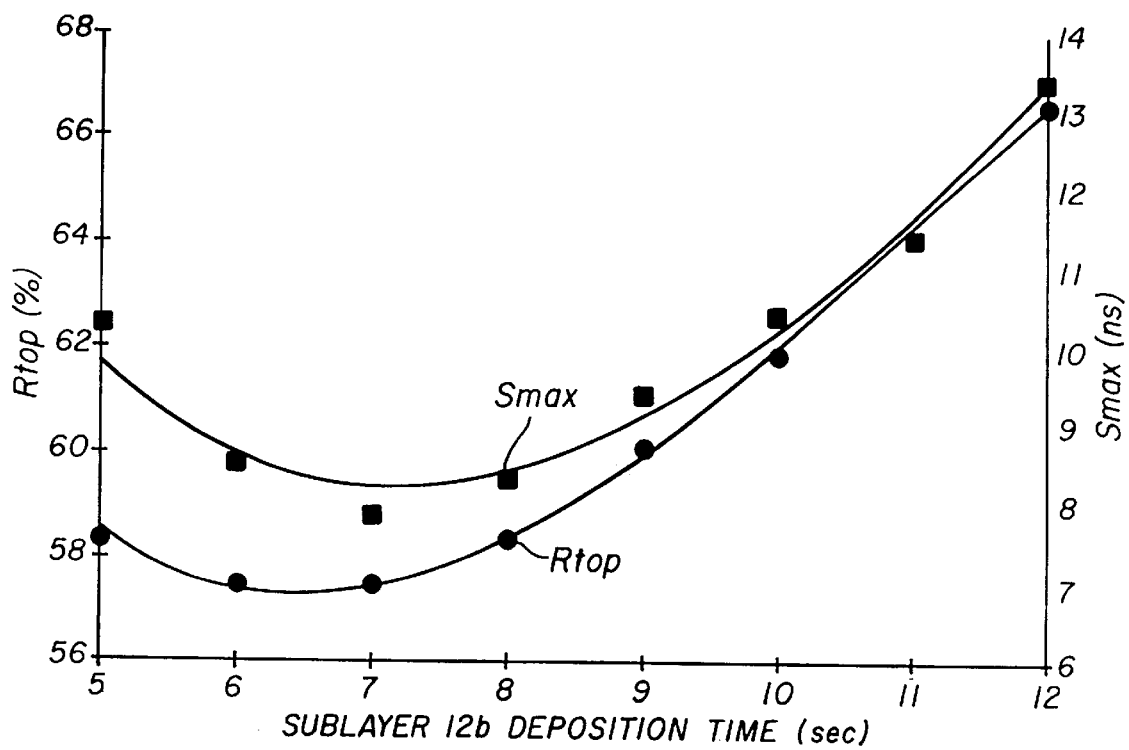
FIGS. 5a–5d are similar to the plots in FIGS. 4a–4d except that different deposition times are used.

The performance data of the discs are also shown in FIGS. 5a, 5b, 5c, and 5d. FIG. 5a is a plot of Rtop vs. deposition time of sublayer 12b. It is clear that Rtop reaches its minimum value when the 12b sublayer deposition time is 6 to 7 seconds. The corresponding recording layer thickness (total thickness of 12a and 12b sublayers) is Tmin. It should be noted that, in FIG. 5a, on the right hand vertical axis, Smax is plotted. FIG. 5a shows that Smax drops with the 12b sublayer deposition time (thickness) and reaches its minimum value at 12b sublayer deposition time of 7 sec and then rises. It is clear that the lowest Smax occurs when the recording layer thickness is close to Tmin.

Figure 5B:
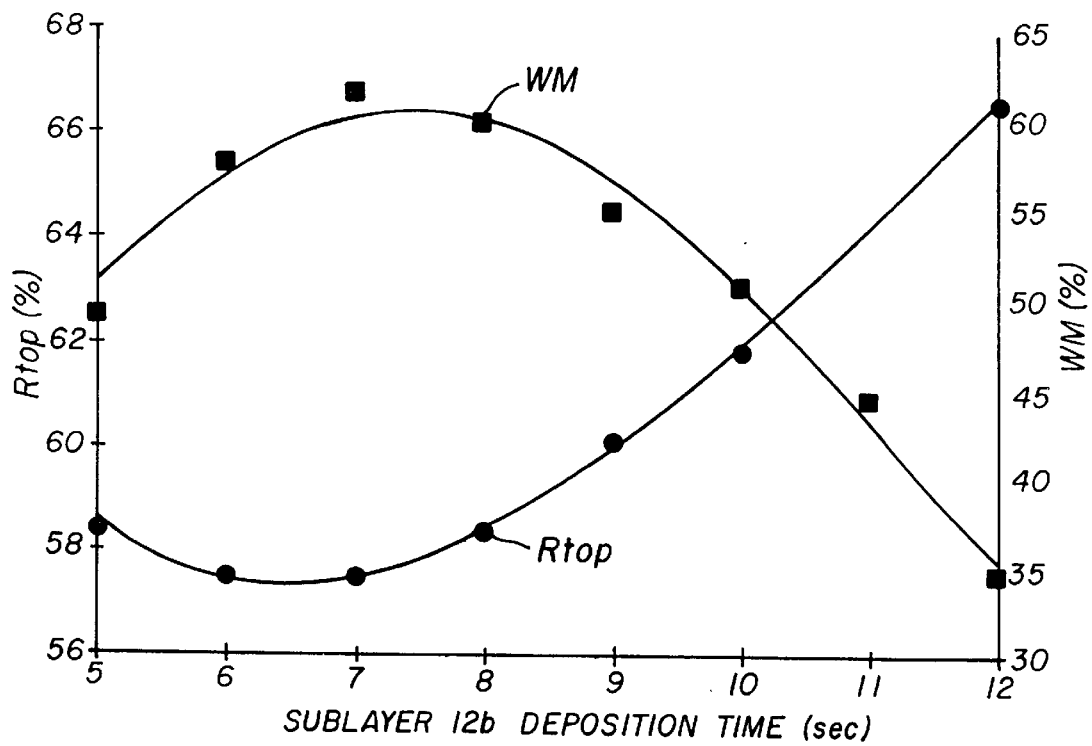

In FIG. 5b it is seen that the WM rises with the sublayer 12b deposition time, reaches its maximum value and then drops. FIG. 5b reveals that the highest WM occurs for the discs with the 12b sublayer deposition time of 7 seconds for which the recording layer thickness is close to Tmin.

Figure 5C:
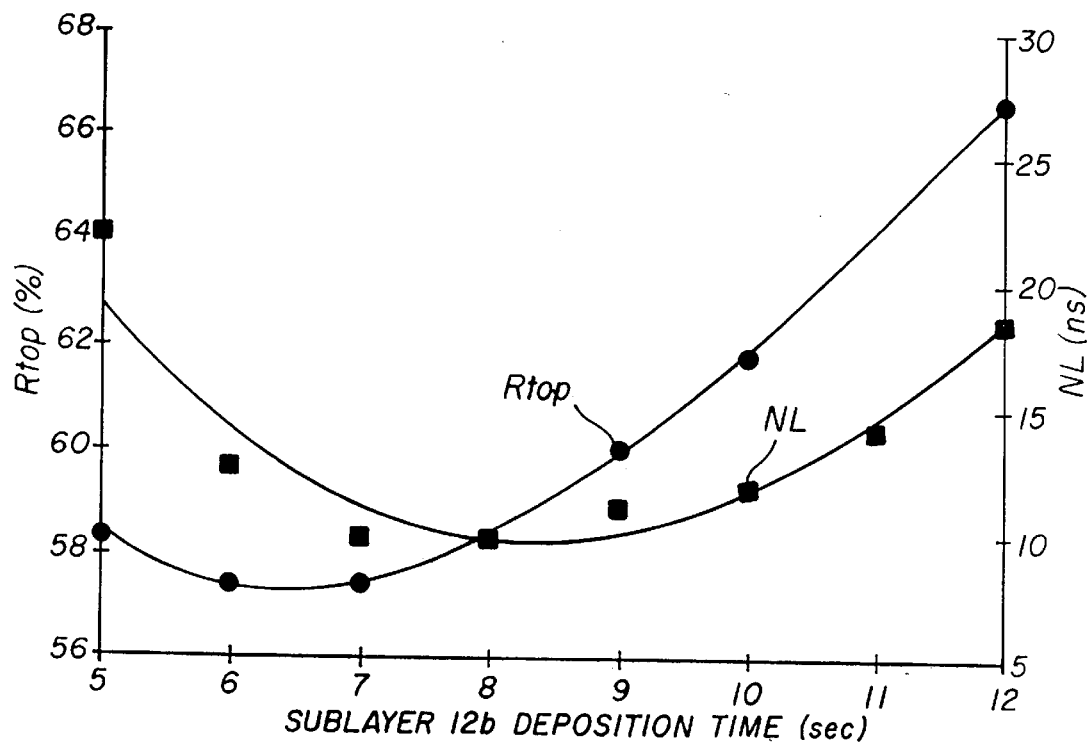

FIG. 5c shows that the NL drops with the sublayer 12b deposition time, reaches its minimum value and then rises. It is clear that the lowest NL occurs for the disc with the 12b sublayer deposition time of 7 or 8 seconds for which the recording layer thickness is close to Tmin.

Figure 5D:
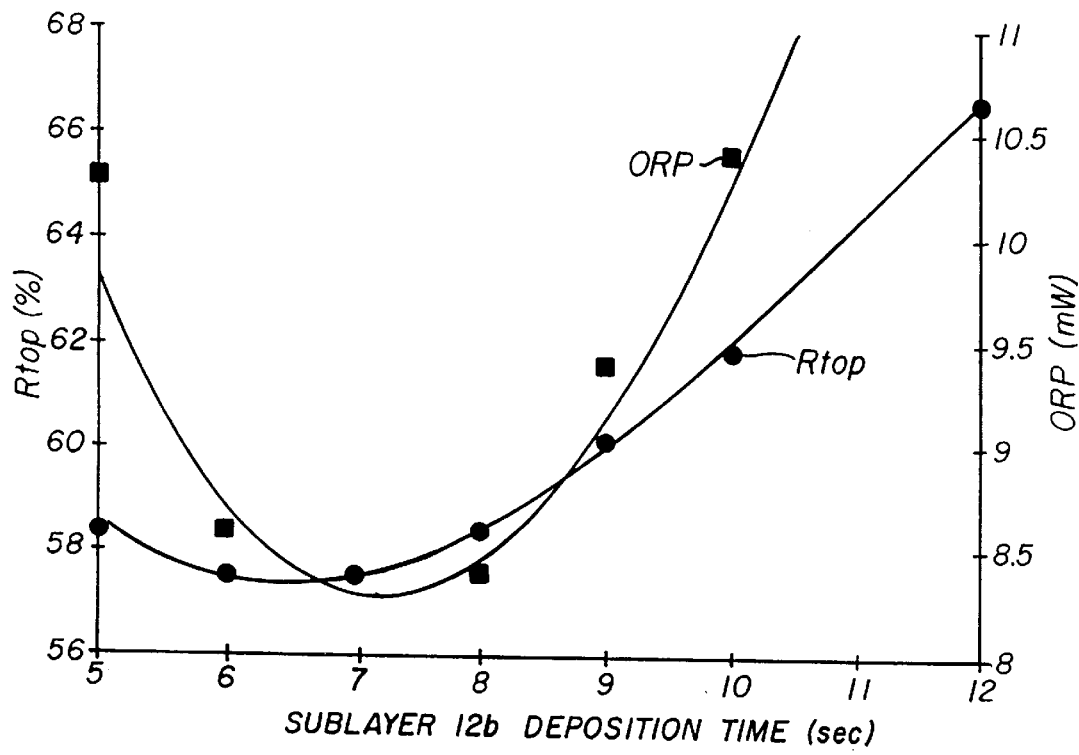

FIG. 5d shows that the ORP decreases with the sublayer 12b deposition time, and then rises. It is clear from FIG. 5d that the highest writing sensitivity occurs for the disc with the sublayer 12b deposition time of 7 seconds for which the recording layer thickness is close to Tmin.

EXAMPLE 4

Another thickness series consisting of eight discs were made. The deposition time for the sublayer 12a was varied in increments of 0.5 seconds from 2 to 5 seconds but the sublayer 12b deposition time was fixed at 8.0 seconds.

After deposition, the discs were coated with a 700 A gold reflector and finished with a spun on and UV cured protective lacquer coat. The discs were heat treated in air for 16 hours at 100° C.

The discs were measured and their performance were determined using the PCD 600 writer/reader as outlined before. The results are given in Table 4.

TABLE 4

| Sublayer 12b deposition Time (sec) | Rtop(%) | Smax(ns) | Wm(%) | NL(ns) | ORP (mW) |
|---|---|---|---|---|---|
| 2.0 | 66.7 | 11.0 | 46.7 | 14.4 | 15.2 |
| 2.5 | 64.9 | 10.0 | 49.6 | 12.5 | 13.4 |
| 3.0 | 64.1 | 9.4 | 51.9 | 12.1 | 11.5 |
| 3.5 | 62.3 | 9.3 | 53.8 | 11.6 | 10.6 |
| 4.0 | 62.3 | 9.0 | 55.2 | 11 | 10.1 |
| 4.5 | 61.9 | 9.1 | 54.9 | 11.1 | 9.7 |
| 5.0 | 61.9 | 9.8 | 53.5 | 10.5 | 9.2 |

Figure 6A:
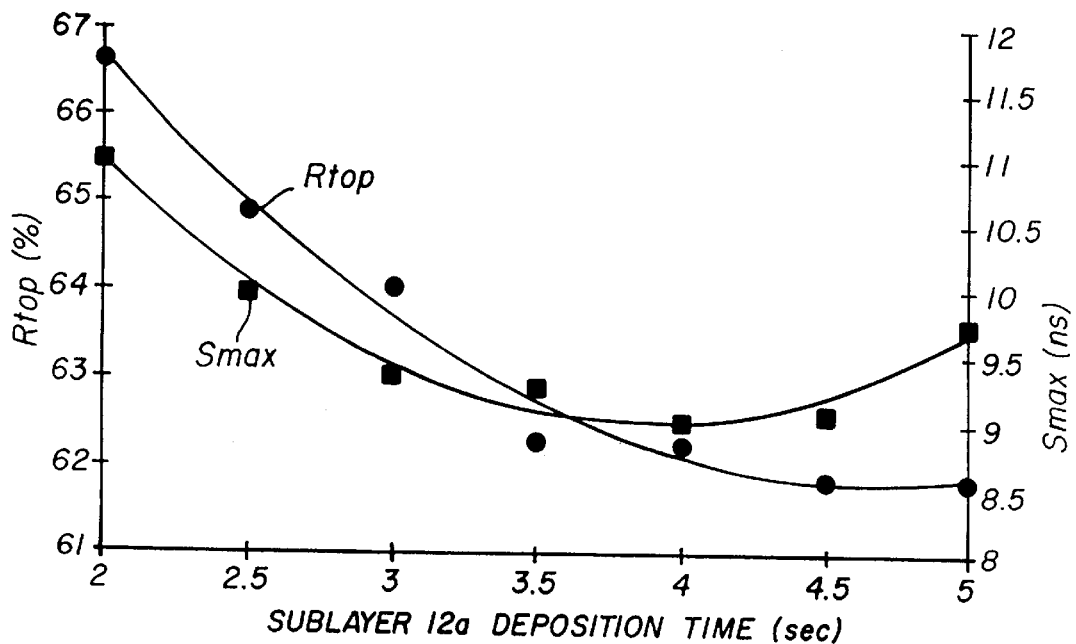
FIGS. 6a–6d are similar to plots in FIGS. 5a–5d except that the deposition time for sublayer 12b is fixed while the deposition time for sublayer 12a is varied.

The performance data of the discs are also shown in FIGS. 6a, 6b, 6c, and 6d. FIG. 6a is a plot of Rtop vs. deposition time of sublayer 12a. FIG. 6a exhibits a very gradual variation of Rtop reflectivity with the sublayer 12a deposition time in the range of 3.5 to 5.0 seconds. It is clear that Rtop reaches its minimum value when the sublayer 12a deposition time is about 4.5 seconds. The corresponding recording layer thickness (total thickness of 12a and 12b sublayers) is Tmin. It should be noted that, in FIG. 6a, on the right hand vertical axis, Smax is plotted. FIG. 6a shows that Smax drops with the sublayer 12a deposition time (thickness) and reaches its minimum value at sublayer 12a deposition layer time of about 4 sec and then rises. It is clear that the lowest Smax occurs when the recording layer thickness is close to Tmin.

Figure 6B:
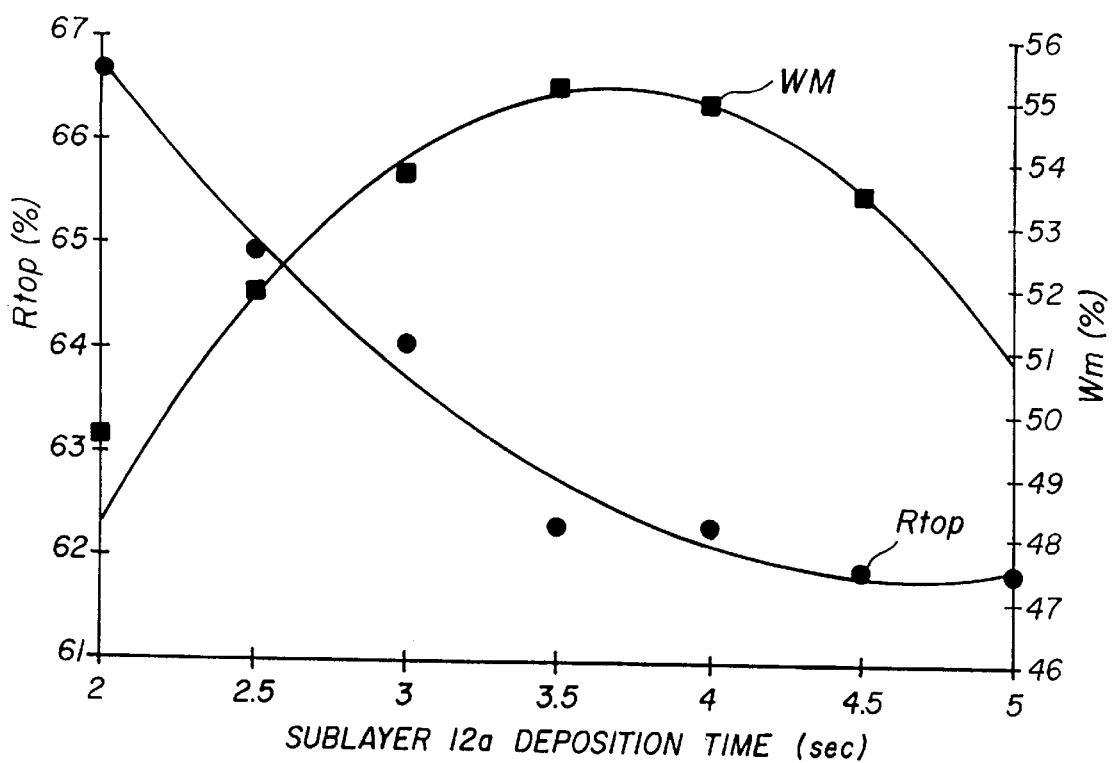

In FIG. 6b it is seen that the WM rises with the sublayer 12a deposition time, reaches its maximum value and then drops. FIG. 6b reveals that the highest WM occurs for the discs with the sublayer 12a deposition time of about 4 seconds for which the recording layer thickness is close to Tmin.

Figure 6C:
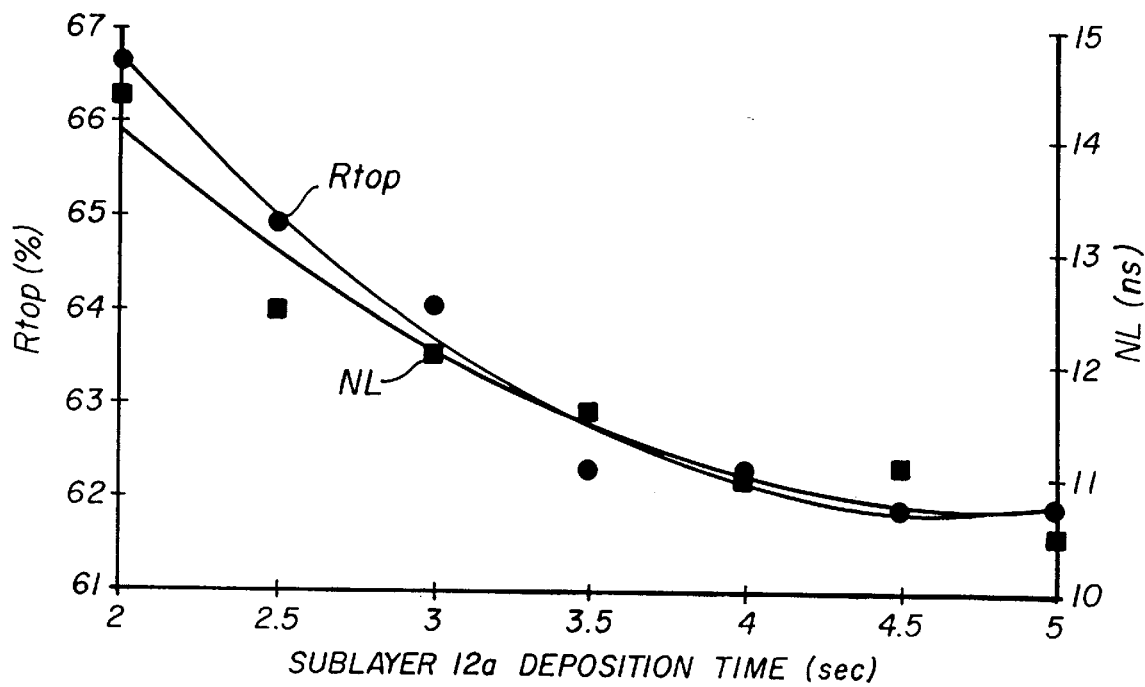

FIG. 6c shows that the NL drops with the sublayer 12a deposition time, reaches its minimum value and then rises. It is clear that the lowest NL occurs for the disc with the sublayer 12a deposition time of about 4.5 seconds for which the recording layer thickness is close to Tmin.

Figure 6D:
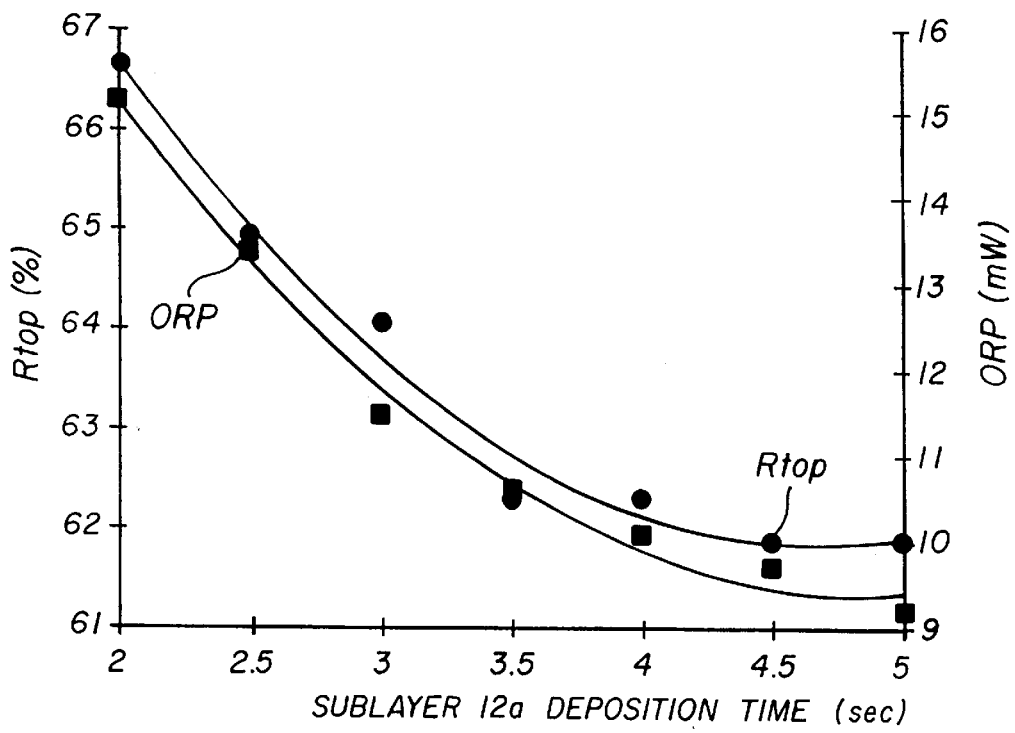

FIG. 6d shows that the ORP decreases with the sublayer 12a deposition time, and then rises. It is clear from FIG. 6d that the highest writing sensitivity occurs for the disc with the sublayer 12a deposition time of about 4.5 or 5 seconds for which the recording layer thickness is close to Tmin.

Examples 1–4 show that a variety of deposition parameters, sublayers configurations and heat treatments have been implemented to generate various thickness series. It is clearly demonstrated that in the neighborhood of Tmin the disc performance was maximized, i.e., the Smax, NL and ORP attained their minimum values and WM reached its maximum value for each and every thickness series.

Even though the performance is maximized at the recording layer thickness which is approximately equal to Tmin, it has been found that acceptable performance can be obtained when the recording layer thickness falls within the range of 0.7 Tmin to 1.3 Tmin.

The invention has been described in detail with particular reference to certain preferred embodiments thereof, but it will be understood that variations, extensions and modifications can be effected within the spirit and scope of the invention.

| PARTS LIST | |
|---|---|
| 10 | substrate |
| 12 | recording layer |
| 12a | sublayer |
| 12b | sublayer |
| 14 | reflective layer |

What is claimed is:

1. A recordable element including a substrate and having over its surface, in order, an optical recording layer and a light reflecting layer, the improvement comprising:

(a) the optical recording layer containing $Te_aGe_bC_cH_dO_e$ where a, b, c, d, and e are atomic percents such that $a+b+c+d+e=100$, and wherein $10<a<40$, $10<b<60$, $5<c<35$, $10<d<35$, $e \geqq 0$;

(b) the optical recording layer having one or more sublayers which can be of different compositions; and (c) the thickness t of the optical recording layer is $0.7\ Tmin<t<1.3\ Tmin$.

2. The recording element of claim 1 wherein there are two or more sublayers in the recording layer, each sublayer includes elements selected from the group consisting of Ge, Te, and C,H.

3. The recording element of claim 1 wherein the two sublayers of different compositions are selected so that each of them have different thermal and optical properties.

4. The recording element of claim 1 wherein the sublayer adjacent to the substrate has a lower hydrocarbon content than the sublayer adjacent to the reflecting layer.

5. The recording element of claim 1 wherein the substrate is polycarbonate or polyacrylate.

6. The recording element of claim 1 wherein the reflecting layer includes elements selected from the group consisting of Au, Ag, Cu, Al, and alloys thereof.

7. The recording element of claim 1 wherein the recording element is modified by heat treatment to change its recording properties.

8. A recordable element comprising a substrate and having over its surface, in order, a recording layer and a light reflecting layer, the improvement comprising:

(a) the optical recording layer containing $Te_aGe_bC_cH_dO_e$ where a, b, c, d, and e are atomic percents such that $a+b+c+d+e=100$, and wherein $10<a<40$, $10<b<60$, $5<c<35$, $10<d<35$, $e \geqq 0$ the recording layer having a material composition graded along its thickness; and (b) the thickness t of the optical recording layer is $0.7\ Tmin<t<1.3\ Tmin$.

9. The recording element of claim 8 wherein the portion of the film adjacent to the substrate has a lower hydrocarbon content than the portion adjacent to the reflecting layer.

10. The recording element of claim 8 wherein the substrate is polycarbonate or polyacrylate.

11. The recording element of claim 8 wherein the reflecting layer includes elements selected from the group consisting of Au, Ag, Cu, Al, and alloys thereof.

12. The recording element of claim 8 wherein the recording element is modified by heat treatment to change its recording properties.

13. A process for making a recordable element including a substrate and having over its surface, in order, an optical recording layer and a light reflecting layer, comprising the steps of:

a) providing an optical recording layer by sputtering the optical recording layer containing $Te_aGe_bC_cH_dO_e$ where a, b, c, d, and e are atomic percents such that $a+b+c+d+e=100$, and wherein $10<a<40$, $10<b<60$, $5<C<35$, $15<(c+d)<65$, $e \geqq 0$; and (b) adjusting the thickness t of the optical recording layer to be in the range of $0.7\ Tmin<t<1.3\ Tmin$.

14. The process of claim 13 wherein there are two or more sublayers in the optical recording layer each sublayer includes elements selected from the group consisting of Ge, Te, and C,H.

15. The process of claim 13 wherein the sublayer adjacent to the substrate has a lower hydrocarbon content than the sublayer adjacent to the reflecting layer.

16. The process of claim 13 wherein the substrate is polycarbonate or polyacrylate.

17. The process of claim 13 wherein the reflecting layer includes elements selected from the group consisting of Au, Ag, Cu, Al, and alloys thereof.

18. The process of claim 13 further including heat treating the recording element to modify the recording properties.

* * * * *

UNITED STATES PATENT AND TRADEMARK OFFICE
CERTIFICATE OF CORRECTION

PATENT NO. : 5,843,553
DATED : December 1, 1998
INVENTOR(S) : George R. Olin, et al It is certified that error appears in the above-identified patent and that said Letters Patent is hereby corrected as shown below:

Abstract, line 6   "10<d<5," should be corrected to read --10<d<35,--

Signed and Sealed this

Fourth Day of May, 1999

Attest:

Q. TODD DICKINSON

Attesting Officer      Acting Commissioner of Patents and Trademarks